United States Patent [19]

Hooper et al.

[11] Patent Number: 4,631,810
[45] Date of Patent: Dec. 30, 1986

[54] SOLID STATE CELL MANUFACTURE

[75] Inventors: Alan Hooper, Nr Faringdon; John M. North, Compton, Nr Newbury, both of England

[73] Assignee: United Kingdom Atomic Energy Authority, London, England

[21] Appl. No.: 658,793

[22] Filed: Oct. 9, 1984

[30] Foreign Application Priority Data

Oct. 19, 1983 [GB] United Kingdom ................. 8328022

[51] Int. Cl.$^4$ ............................................. H01M 4/04
[52] U.S. Cl. ..................... 29/623.5; 427/58; 427/393.5
[58] Field of Search ............................. 427/393.5, 58; 29/623.5

[56] References Cited

U.S. PATENT DOCUMENTS 4,242,412 12/1980 Funaki et al. ............... 427/393.5 X
4,303,748 12/1981 Armand et al. .................... 429/192

OTHER PUBLICATIONS

*General Chemistry*, Markham et al. pp. 77-78.

Primary Examiner—Bernard D. Pianalto
Attorney, Agent, or Firm—Larson and Taylor

[57] ABSTRACT

A unitary polymer electrolyte/polymer-based cathode film component for use in a solid state electrochemical cell is manufactured by solution casting onto one of the electrolyte or cathode, a solution of the other of the electrolyte or cathode.

The solution is prepared at elevated temperature (e.g. 40°-50° C.) and cooled to a lower temperature, e.g. ambient, before carrying out the casting. The solvent (e.g. methanol) is such that the polymer (e.g. poly (ethylene oxide)) is only sparingly soluble therein at the lower temperature and relatively readily soluble therein at the elevated temperature. Also, immediate precipitation of the polymer does not occur on cooling the solution from the elevated temperature to the lower temperature. In this way, dissolution of said one of the electrolyte or cathode is avoided.

5 Claims, 1 Drawing Figure

SOLID STATE CELL MANUFACTURE

This invention relates to a method of making a unitary electrolyte/cathode component for use in a solid state electrochemical cell comprising an anode having lithium as its active material, the electrolyte in the form of a lithium ion conducting polymer, and the cathode in the form of a composite of an insertion electrode material or similarly active material in combination with a polymeric material.

A solid state electrochemical cell comprising a Li or Li-based anode, a lithium ion conducting polymeric electrolyte, and a cathode based on an insertion electrode material such as $V_6O_{13}$, $V_2O_5$ or $TiS_2$ is known. See, for example, European Patent Application Publication No. 0 013 199 (corresponding to U.S. Pat. No. 4,303,748). In order to achieve high active cathode utilizations at realistic current densities, the cathode may be constructed as a composite structure comprising the insertion electrode material (active catholyte), the polymer electrolyte and, if required, an electronically conducting medium such as graphite. Examples of preferred proportions are: 20% to 70% polymer electrolyte, 30% to 80% active catholyte and, if required, 1% to 20% of an electronically conducting medium, where all percentages are by volume.

The above-mentioned European Patent Application refers to the possibility of fabricating the electrolyte and the cathode as one component but does not describe how this might be done. A known way of fabricating polymer-based electrolytes and electrodes in the form of films is by solution casting followed by evaporation of the solvent. However, a major problem in solution casting one of an electrolyte and an electrode onto the other of the electrolyte and the electrode as substrate, in an attempt to fabricate electrolyte and cathode as one component, would be dissolution of the substrate by the solvent. The present invention provides a way of overcoming this problem.

Thus, the present invention provides a method of making a unitary electrolyte/cathode film component for use in a solid state electrochemical cell comprising an anode having lithium as its active material, a polymeric electrolyte, and a cathode in the form of a composite of an insertion electrode material or similarly active material in combination with a polymeric material, which method comprises the steps of (i) preparing a solution of one of the electrolyte or the cathode material in a solvent at an elevated temperature, the polymer and the solvent having the properties that the polymer is readily soluble therein at the elevated temperature and sparingly soluble therein at a lower temperature, and that immediate precipitation of the polymer does not occur on cooling the solution from the elevated temperature to the lower temperature;

(ii) cooling the solution to the lower temperature and solution casting onto a film of the other of the electrolyte or the cathode material followed by evaporation of the solvent to form a film of said one of the electrolyte or the cathode material.

The invention ensures that, in step (ii), dissolution of the other of the electrolyte or the cathode does not take place as a result of solution casting. The ability to be able to produce a unitary electrolyte/cathode component means there are fewer individual components to assemble when fabricating the final electrochemical cell and improves the quality of the interface between the electrolyte and the cathode.

It should be understood that "solution" does not necessarily mean that no insoluble matter is present therein. Thus, insoluble matter may be present in dispersion in the solvent if required in the electrolyte or cathode material. The dissolved matter in the solution is the polymer or polymer-salt complex. The terms "elevated temperature" and "lower temperature" are merely used, subject to the conditions stated in step (i) above, to indicate a relative relationship between the temperatures, i.e. the lower temperature, which may be ambient, is lower than the elevated temperature.

The electrolyte may be a complex of a macromolecular material such as poly(ethylene oxide), referred to hereinafter as PEO, or poly(propylene oxide), referred to hereinafter as PPO, with a lithium salt, the anion of which may, for example, be $I^-$, $Br^-$, $ClO_4^-$, $SCN^-$ or $F_3CSO_3^-$. The composite cathode may contain as an insertion electrode material, a material known in the art such as exemplified above, and, as a polymeric material, a material such as PEO or PPO. If required, the composite cathode may also contain an electronically conducting medium such as graphite or other forms of carbon.

When the polymer in the electrolyte and cathode material is PEO, an example of a suitable solvent in the practice of the invention is methanol. Thus, PEO (or a complex thereof) is only sparingly soluble in methanol at ambient temperature but is relatively easily soluble therein at an elevated temperature such as 40° to 50° C. Moreover, cooling a solution of PEO in methanol from the elevated temperature to ambient temperature does not cause the PEO to separate out immediately, i.e. there is an hysteresis effect in the stability-temperature characteristic of the PEO/methanol system.

In the practice of the invention, the electrolyte material may be solution cast onto the cathode material or the cathode material may be solution cast onto the electrolyte material, depending upon the required specific design of the electrochemical cell. Preferably, the material onto which the other material is cast is carried by a current collector, for example in the form of a metal foil. The coating process may, if necessary, have to be repeated more than once to form a continuous film. Determining factors in this respect may include particle size of solid components in the composite cathode film and the viscosity of the coating solution.

The solution casting procedure in step (ii) may be carried by methods known in the art such as doctor blade casting or spinning.

The unitary electrolyte/cathode film component made by the method of the invention may be made into a solid state electrochemical cell in combination with an anode by, for example, stacking, rolling or folding into the required configuration and containment within a suitable cell casing.

One way of carrying out the invention will now be described, by way of example, as follows. Reference will be made in the example to the accompanying drawing, the sole FIGURE of which is a graph showing the relationship between cell voltage and capacity for a cell made using a unitary electrolyte/cathode film component made according to the invention.

EXAMPLE

A composite cathode was prepared by dispersing $V_6O_{13}$ and acetylene black in a solution of PEO in acetonitrile; a small quantity of SPAN 80 was also included as dispersant. The resulting dispersion was applied to a nickel foil current collector by doctor blade casting and the solvent removed by evaporation to give a composite cathode in the form of a film. The composition of the dispersion was such that the composition of the composite cathode by volume was: 50% PEO, 45% $V_6O_{13}$ and 5% acetylene black. The thickness of the composite cathode film was ~35 μm.

A solution of PEO and $LiF_3CSO_3$ in methanol was prepared at 40° to 50° C. The solution was cooled to ambient temperature and applied to the above-prepared composite cathode film by doctor blade casting and the solvent removed by evaporation. The procedure was repeated to give an electrolyte film of total thickness ~50 μm carried by the composite cathode to constitute a unitary electrolyte/cathode component.

The above-prepared unitary electrolyte/cathode component together with a Li metal foil anode of thickness ~300 μm were assembled into an electrochemical cell of area 0.75 cm² which was then tested under the following conditions:

| operating temperature | 135° C. | |
|---|---|---|
| discharge current | 0.2 mA | constant current cycling anode |
| charge current | 0.1 mA | |
| voltage limits | 1.7 volts to 3.25 volts | |

DESCRIPTION OF THE DRAWING

The capacity of the cell in relation to voltage for the first discharge is shown in the FIGURE of the accompanying drawing.

The cathode utilization at various discharge numbers was as follows:

Figure 1:
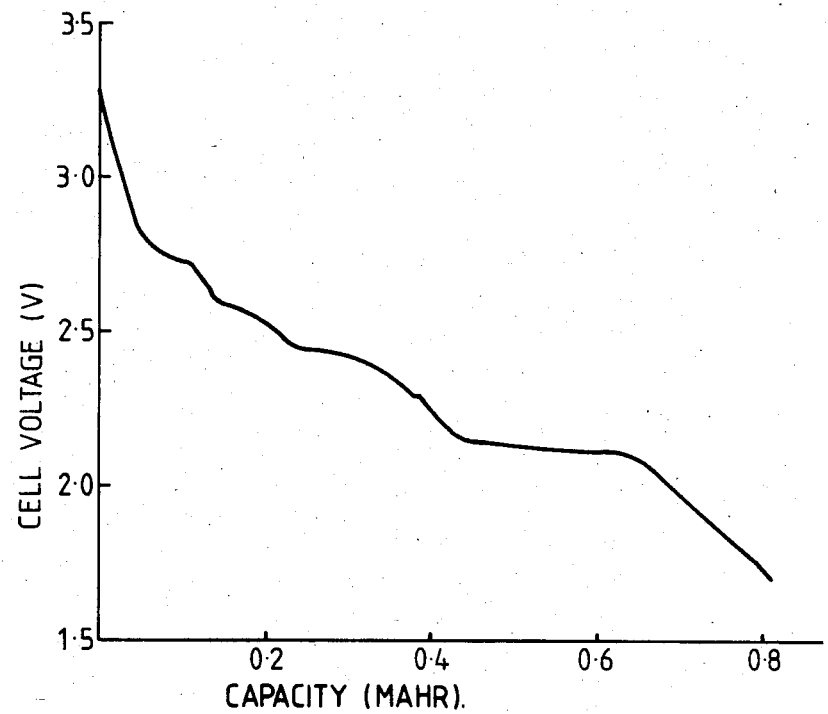

| | |
|---|---|
| No 1 - | 74% |
| No 5 - | 70% |
| No 10 - | 60% |
| No 20 - | 52% |

We claim:

1. A method of making a solid state electrochemical cell comprising an anode having lithium as its active material, a polymeric electrolyte, and a composite cathode in the form of a composite of an insertion electrode material or similarly active material in combination with a polymeric material, which method comprises the steps of
   (i) preparing a solution of one of the polymeric electrolyte or the composite cathode material in a solvent at an elevated temperature, the polymer of the electrolyte and the composite cathode and the solvent having the properties that the polymer is readily soluble in said solvent at the elevated temperature, and sparingly soluble in said solvent at a lower temperature, and that immediate precipitation of the polymer does not occur on cooling the solution of the polymer in said solvent from the elevated temperature to the lower temperature;
   (ii) cooling the polymer solution to the lower temperature and solution-casting the cooled polymer solution onto a film of the other of the polymeric electrolyte or the composite cathode followed by evaporation of the solvent to form a film of said one of the polymeric electrolyte or the composite cathode thereby to give a unitary electrolyte/cathode film component; and
   (iii) assembling said unitary electrolyte/cathode film component with an anode, to form a solid state electrochemical cell.

2. A method as claimed in claim 1 wherein the electrolyte is a complex of a macromolecular material with a lithium salt.

3. A method as claimed in claim 2 wherein the solvent is methanol.

4. A method as claimed in claim 3 wherein the elevated temperature is in the range of 40° to 50° C. and the lower temperature is ambient temperature.

5. A method as claimed in claim 1 wherein the polymer in the electrolyte and cathode material is poly(ethylene oxide).

* * * * *